United States Patent
Page et al.

(10) Patent No.: US 10,380,545 B2
(45) Date of Patent: Aug. 13, 2019

(54) PRODUCT INVENTORY SYSTEM

(71) Applicant: Autodesk, Inc., San Rafael, CA (US)

(72) Inventors: James Sherwood Page, Berkeley, CA (US); Gordon Kurtenbach, Toronto (CA); Mary Hope McQuiston, Larkspur, CA (US); Hans Kellner, Oakland, CA (US); Anthony Christopher Kipkirui Yegon Ruto, Basingstoke (GB)

(73) Assignee: Autodesk, Inc., San Rafael, CA (US)

( * ) Notice: Subject to any disclaimer, the term of this patent is extended or adjusted under 35 U.S.C. 154(b) by 374 days.

(21) Appl. No.: 14/745,133

(22) Filed: Jun. 19, 2015

(65) Prior Publication Data

US 2016/0371651 A1    Dec. 22, 2016

(51) Int. Cl.
*G06Q 10/08* (2012.01)
*G06Q 30/06* (2012.01)

(52) U.S. Cl.
CPC ..... *G06Q 10/0875* (2013.01); *G06Q 30/0631* (2013.01)

(58) Field of Classification Search
USPC .......................................... 705/26.8, 28, 35
See application file for complete search history.

(56) References Cited

U.S. PATENT DOCUMENTS

| | | | | |
|---|---|---|---|---|
| 2002/0143667 | A1* | 10/2002 | Ho | G06Q 10/087 705/28 |
| 2004/0236641 | A1* | 11/2004 | Abbott | G06Q 10/04 705/28 |
| 2007/0011062 | A1* | 1/2007 | Eagle | G06Q 10/063 705/35 |
| 2012/0221433 | A1* | 8/2012 | Plattsmier | G06Q 30/0633 705/26.8 |

* cited by examiner

*Primary Examiner* — Fahd A Obeid
*Assistant Examiner* — Reva R Danzig
(74) *Attorney, Agent, or Firm* — Fish & Richardson P.C.

(57) ABSTRACT

Methods, systems, and apparatus include computer programs encoded on a computer-readable storage medium, including a method for suggesting products from available parts. A plurality of available parts in an inventory is identified, including identifying at least one assembly of plural individual parts or sub-assemblies. For each assembly, plural sub-assemblies or individual parts included in a respective assembly are determined. An inventory list is created that includes the plurality of available parts, the at least one assembly, and the determined sub-assemblies or individual parts of an assembly. An inventory of products is identified that constitute assemblies. Each product in the inventory of products has a respective parts list identifying parts required to build the product. The inventory list is evaluated including comparing the inventory list to the inventory of products to locate candidate products constructible using the elements included in the inventory list. Product suggestions are output.

16 Claims, 3 Drawing Sheets

FIG. 3

PRODUCT INVENTORY SYSTEM

BACKGROUND

This specification relates to manufacturing products.

Manufacturers can construct products that are assembled, for example, from any number of parts and sub-assemblies. Each sub-assembly can be made from any number of parts and/or other sub-assemblies. The parts needed to build a product can be specified, for example, in a bill of materials, a parts list, or in some other specification.

Manufacturers can maintain and/or use inventories of parts, sub-assemblies and assemblies. At any given time, a manufacturer may have parts in inventory, for example, to build one or more products. Decisions to build products, for example, can be based on existing parts in inventory and the cost and/or other factors in finding parts that are needed.

SUMMARY

In general, in one aspect a computer-implemented method is provided and includes identifying a plurality of available parts in an inventory including at least one assembly of plural individual parts or sub-assemblies. For each assembly, the method includes determining one or more sub-assemblies or individual parts that are included in a respective assembly, creating an inventory list including the plurality of available parts, the at least one assembly and the determined sub-assemblies or individual parts of an assembly, identifying an inventory of products that constitute assemblies, each product in the inventory of products having a respective parts list that identifies parts required to build a respective product, evaluating the inventory list including comparing the inventory list to the inventory of products to locate candidate products in the inventory of products that can be constructed using the elements included in the inventory list and outputting suggestions for products based on the evaluating.

The method can further include providing information for use in a user interface to prompt a user for hints to classify a type of candidate product including prompting the user to determine a classification of the candidate product, classifying the products in the inventory of products based on a response to the prompt, and selecting a candidate product based on the classifying and the inventory list. Evaluating can include determining a set of candidate products that can be constructed based on the inventory list, and wherein outputting includes outputting the set of candidate products. Evaluating the inventory list can include determining a set of candidate products that cannot be constructed based on the inventory list, including identifying at least one candidate product that cannot be constructed, determining one or more parts not included in inventory that is required to build the one candidate product, and outputting a list of the determined one or more parts required to build the one candidate product. The method can further include outputting instructions to print, using a 3D printer, at least one of the one or more parts not included in inventory. Outputting suggestions includes locating instructions for assembling one or more products that are suggested and outputting instructions for assembling a selected one of the suggestions. The method can further include rating the parts, sub-assemblies and assemblies in the inventory list based on one or more criteria, and wherein evaluating the inventory includes creating suggestions based on use of highest-rated components from the inventory list. Rating the parts can include determining a value associated with each component in the inventory list, and wherein the value is based one or more of an initial cost of the component, a replacement cost of the component, a commonality of the component, or a complexity the component is Identifying the plurality of available parts in the inventory can include evaluating one or more images of the available parts and recognizing individual parts, sub-assemblies and assemblies from the images. Identifying a plurality of available parts can include evaluating a bill of materials for an assembly to locate individual parts and sub-assemblies and deconstructing located sub-assemblies into individual parts. The method can further include evaluating each sub-assembly to locate further sub-assemblies or individual parts of a respective sub-assembly.

In another aspect, a computer program product embodied in a non-transitory computer-readable medium includes instructions, that when executed, cause one or more processors to execute the computer implemented method described above.

In another aspect, a system is provided that includes one or more processors; and one or more memory elements including instructions that, when executed, cause the one or more processors to execute the method described above.

Particular implementations may realize none, one or more of the following advantages. An entity (e.g., an individual or a manufacturer) can construct products from existing inventory, e.g., without having to order, make or wait for additional parts. When inventories need to be reduced, e.g., to make room for other parts, existing inventories can be examined to determine products that can be immediately constructed (i.e., to use up the parts that are on hand). If a single or small number of parts are missing from a parts list to build a product, the single part can be manufactured, e.g., using a 3D printer.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for suggesting products that can be made with existing parts. For example, an audit/design suggestion tool can be used to evaluate available parts, sub-assemblies and assemblies in an inventory list and determine which other designs embodying one or more products can be constructed from the available parts/sub-assemblies/assemblies. In some implementations, evaluating the inventory list can include determining a set of candidate products that can be constructed based on the inventory list, and the set of candidate products can be output to a user. In some implementations, 3D printing can be used to generate additional (e.g., missing) parts, e.g., when all other parts are otherwise available to construct a product.

Figure 1:
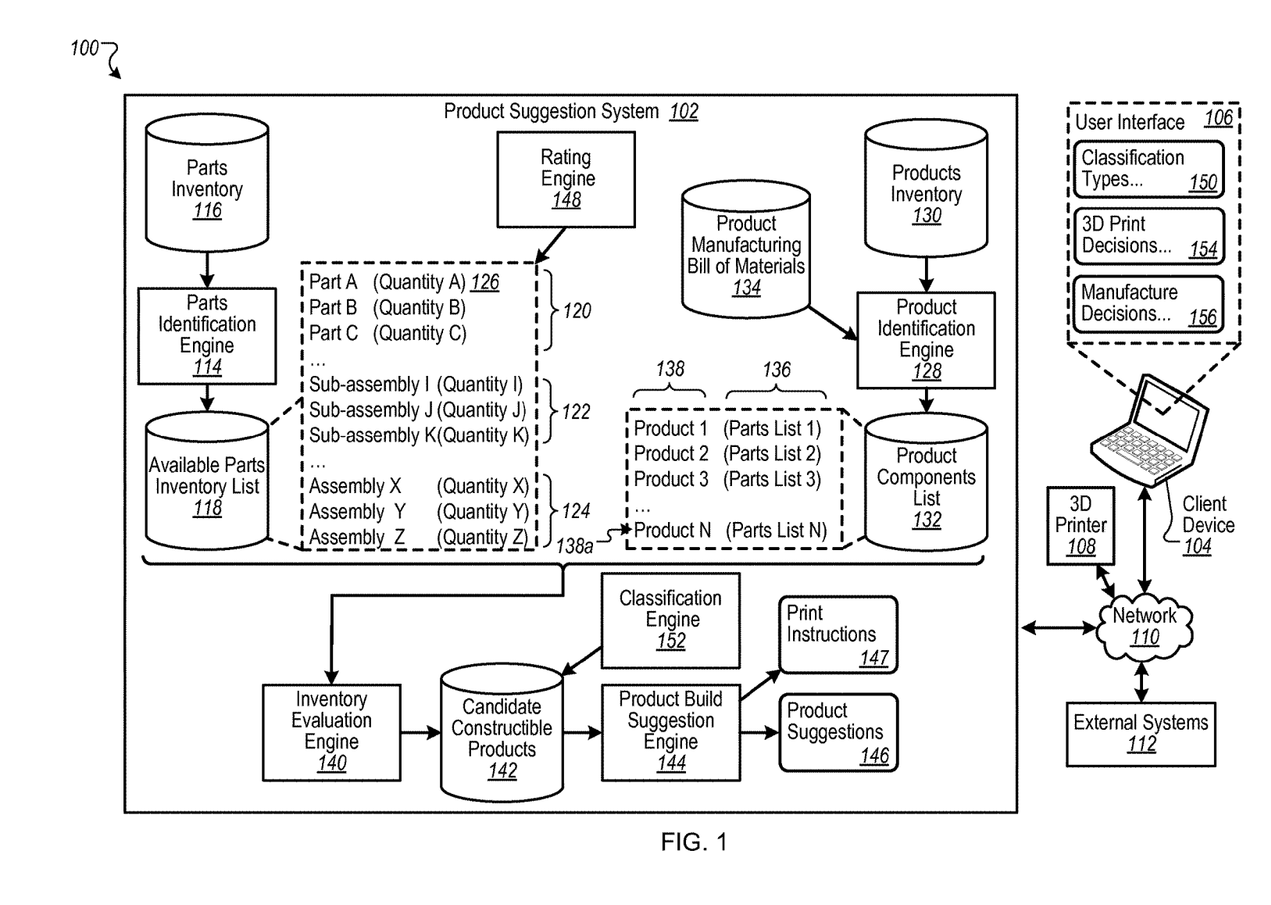
FIG. 1 is a block diagram of an example environment for suggesting products that can be made with existing parts.

FIG. 1 is a block diagram of an example environment 100 for suggesting products that can be made with existing parts. The environment 100 includes a product suggestion system 102 for suggesting products that can be made from available parts. Parts that are suggested for use can include, for example, un-used parts and/or parts that are already incorporated in existing sub-assemblies or assemblies. As such, suggestions for making products from existing parts can include instructions for disassembling existing components to harvest parts needed in new or newly to be constructed products.

The product suggestion system 102 can be accessed by at least one client device 104. For example, the client device 104 can provide a user interface 106 by which a user of the client device 104 can interact with the product suggestion system 102 (or receive and use associated information). In some implementations, the product suggestion system 102 can be included in a server system that is available at a manufacturing facility or some other facility that controls or decides on the manufacturing of products (e.g., based on available parts). Alternatively, the product suggestion system 102 can be of the form of an application executing on a device or a service that is accessible through a network, such as the Internet. In some implementations, at least one 3D printer 108 can also be used, e.g., to print one or more parts (e.g., out-of-stock parts) that are needed for manufacturing a product. A network 110 can connect the product suggestion system 102, the at least one client device 104, the at least one 3D printer 108, and any external systems 112 that may be involved in the manufacturing process or decision-making. Some or all of the components, including the product suggestion system 102 and the user interface 106, may be combined into one or more integrated applications and/or systems.

In some implementations, some or all of the components of the environment 100 can be located at the same location, or the components may be distributed. As such, the network 110 can include the Internet, a local area network (LAN), a wide area network (WAN), or some combination of networks. Other architectures of the environment 100 are possible.

The product suggestion system 102 can include plural engines. Some or all of the plural engines may be combined or may be separate, and the plural engines may be co-located or distributed (e.g., connected over the network 110).

A parts identification engine 114, for example, can identify available parts in an inventory (e.g., a parts inventory 116). Identification of the parts can include, for example, identifying at least one assembly of plural individual parts and/or sub-assemblies. For example, different parts (e.g., a tool box drawer and its screw-in handles) can be used to construct a sub-assembly (e.g., an assembled tool box drawer). Combinations of sub-assemblies and parts (e.g., plural assembled tool box drawer and a cabinet) can be used to make assemblies (which themselves can be used to create other products). In some implementations, an assembly can be an end product. The parts identification engine 114 can determine, for each assembly, plural sub-assemblies or individual parts that are included in a respective assembly. The finished tool box product is a simple example, as typical assemblies can include several sub-assemblies and parts, and each sub-assembly can itself be built from plural sub-assemblies and/or parts. Using information for assemblies, sub-assemblies and parts, for example, the parts identification engine 114 can create an available parts inventory list 118 that includes the plurality of available parts, the at least one assembly, and the determined sub-assemblies or individual parts of an assembly. The information can allow the product suggestion system 102 (or its customers) to decide, for example, whether to build certain products using parts in inventory and/or parts harvested from existing assemblies.

The parts inventory 116 can include parts availability information, for example, that identifies which parts, sub-assemblies and assemblies from the parts inventory 116 are to be considered for the available parts inventory list 118. Information for parts can include, for example, part identification information (e.g., part numbers, serial numbers, sizes/dimensions, weight and images) and other part information such as current plans for using an existing part (e.g., as part of a reservation system or model). In some implementations, the parts identification engine 114 can be programmed to disregard parts, sub-assemblies and/or assemblies that are already scheduled for near-term use and/or delivery or have other restrictions.

The available parts inventory list 118, for example, can include information for the parts, sub-assemblies and assemblies, including information that identifies the quantity of each component (e.g., quantity A 126 for a Part A). The available parts inventory list 118 can also include other information, e.g., part information (e.g., part numbers, serial numbers, etc.) obtained from the parts inventory 116 and information as to a time and/or an expense associated with disassembling sub-assemblies and/or assemblies in order to harvest specific parts.

A product identification engine 128 can identify, for each product in a products inventory 130, a respective parts list (e.g., a product components list 132) that identifies parts that are required to build the product. In some implementations, to construct the product components list 132, the product identification engine 128 can use information from a product manufacturing bill of materials 134. For example, bill of materials information can be used to identify a parts list 136 needed to manufacture a particular product 138. For example, Product N 138a may require two sub-assembly K's, three Part A's, and one Part B, among other components. Depending on whether the components are included in the available parts inventory list 118, for example, the product identification engine 128 can determine whether Product N 138a will be suggested for build, assembly or manufacture. Other considerations are possible. In some implementations, a bill of materials for a product can be described in terms of sub-assemblies, e.g., in addition to parts alone.

The product components list 132, can identify an inventory of products that constitute assemblies (e.g., products 138 and their associated parts lists 136). The product components list 132 can also identify, on a product basis, an amount of time or an expense needed to manufacture a particular product 138. In some implementations, a parts list 136 can be represented as a list of parts alone, or the parts list 136 can include one or more higher level combinations of parts assemblies or sub-assemblies, e.g., to match against such higher levels of combinations of parts that may be included in the available parts inventory list 118.

An inventory evaluation engine 140, for example, can use information from the available parts inventory list 118 and product build information in order to identify products that are candidates for building. For example, the inventory evaluation engine 140 can evaluate and compare information in the available parts inventory list 118 and the product components list 132 to identify candidate constructible products 142.

A product build suggestion engine 144, for example, can output product suggestions, including products that can be built using elements included in the available parts inventory list 118. The product build suggestion engine 144 can create product suggestions 146, for example, when requests for product suggestions are received from the client device 104. Suggestions can be based on several factors, e.g., including ratings associated with parts that are available for use in new products.

A rating engine 148, for example, can rate parts, sub-assemblies and assemblies identified in the available parts inventory list 118 based on one or more criteria. The ratings can be used, for example, when creating suggestions for products to be manufactured, such as using the highest-rated components from the available parts inventory list 118. In some implementations, ratings determined by the rating engine 148 can be based on rating values determined for each component in the available parts inventory list 118. Each rating value, for example, can be based on one or more of an initial cost of the component, a replacement cost of the component, an on hand commodity of the component, commonality of the component, or a complexity the component to name a few examples. Ratings can also be based on other factors, such as promised delivery dates of existing products/assemblies/sub-assemblies), expected replenishment of replacement products/assemblies/sub-assemblies, materials and/or time needed for their manufacture, equipment (e.g., 3D printers) available to fabricate a part, or personnel available to perform work associated with harvesting parts or fabricating new ones.

Information provided by (or available from) the product suggestion system 102 can be used by at least one client device 104. For example, product suggestions 146 and other information (e.g., related to missing parts as discussed below) provided by the product suggestion system 102 can be presented in the user interface 106 for display to a user, such as someone who can decide which suggested products will/can be made.

In some implementations, the user interface 106 can be used for other purposes. For example, upon accessing a classification types control 150 (and subsequent user interface), the user can receive and respond to prompts associated with classifying types of candidate products (e.g., from among the candidate constructible products 142). The user can be prompted, for example, to provide a classification of one or more particular candidate products. Based on a response to the prompt, for example, a classification engine 152 can classify respective products in the candidate constructible products 142. Using additional controls, for example, the user can select a candidate product (e.g., from the candidate constructible products 142) based on the classifying. Classifications can relate to type of product, complexity of product, uniqueness of product, source of parts or other classification schemes.

In some implementations, users can elect to have certain parts printed (e.g., on a 3D printer) or manufactured in some other way. For example, using 3D print decisions controls 154, the user can elect to have some parts printed by the 3D printer 108. Parts to be printed, for example, can be identified from the candidate constructible products 142, e.g., products for which almost all parts are already available. Parts identified to be printed may be included in products that can be constructed using a combination of parts and/or sub-assemblies that are on hand in the available parts inventory list 118 together with parts that are printed, manufactured or otherwise obtained (e.g., that are absent from the available parts inventory list 118).

Based on information on hand, including product suggestions 146 and/or other information (e.g., cost information) provided by the product suggestion system 102, the user can decide which products are to be built from on-hand parts and sub-assemblies and/or 3D-printable or otherwise manufacturable parts, sub-assemblies or assemblies. For example, the user can use a manufacture decisions controls 156 to decide and specify which products are to be built. In some implementations, selections made by the user to build products using the candidate constructible products 142 can be automatically entered into process control and/or manufacturing processes. In some implementations, information associated with elections made by the user to manufacture products can be used to automatically update the available parts inventory list 118 and/or the candidate constructible products 142, e.g., to account for (or mark as assigned) parts and sub-assemblies to be incorporated into elected products. In some implementations, the available parts inventory list 118 may be an aggregate list, that is, associated with more than one person, manufacturer or other entity.

In some implementations, some or all of the product suggestion system 102 can be a web-based product manufacturing suggestion solution available to manufacturers or individuals over the network 110. The solution can use, for example, pre-defined interface specifications that identify formats and contents of the input and output information. For example, manufacturers at factories at Locations A and B can each provide formatted versions of their own parts inventory 116 and product components list 132 as input to the product suggestion system 102. Upon evaluation of the received information, for example, the product suggestion system 102 can provide product suggestions 146 and/or other information that can be constructed from inventory (either individual inventory associated with a respective location or a combination of components available from more than 1 location).

In some implementations, the product suggestion system 102 can provide print instructions 147 for parts that are to be printed. For example, the candidate constructible products 142 may include some products for which almost all parts and sub-assemblies are immediately available, e.g., missing a single part that can be printed by the 3D printer 108 using the print instructions 147.

Figure 2:
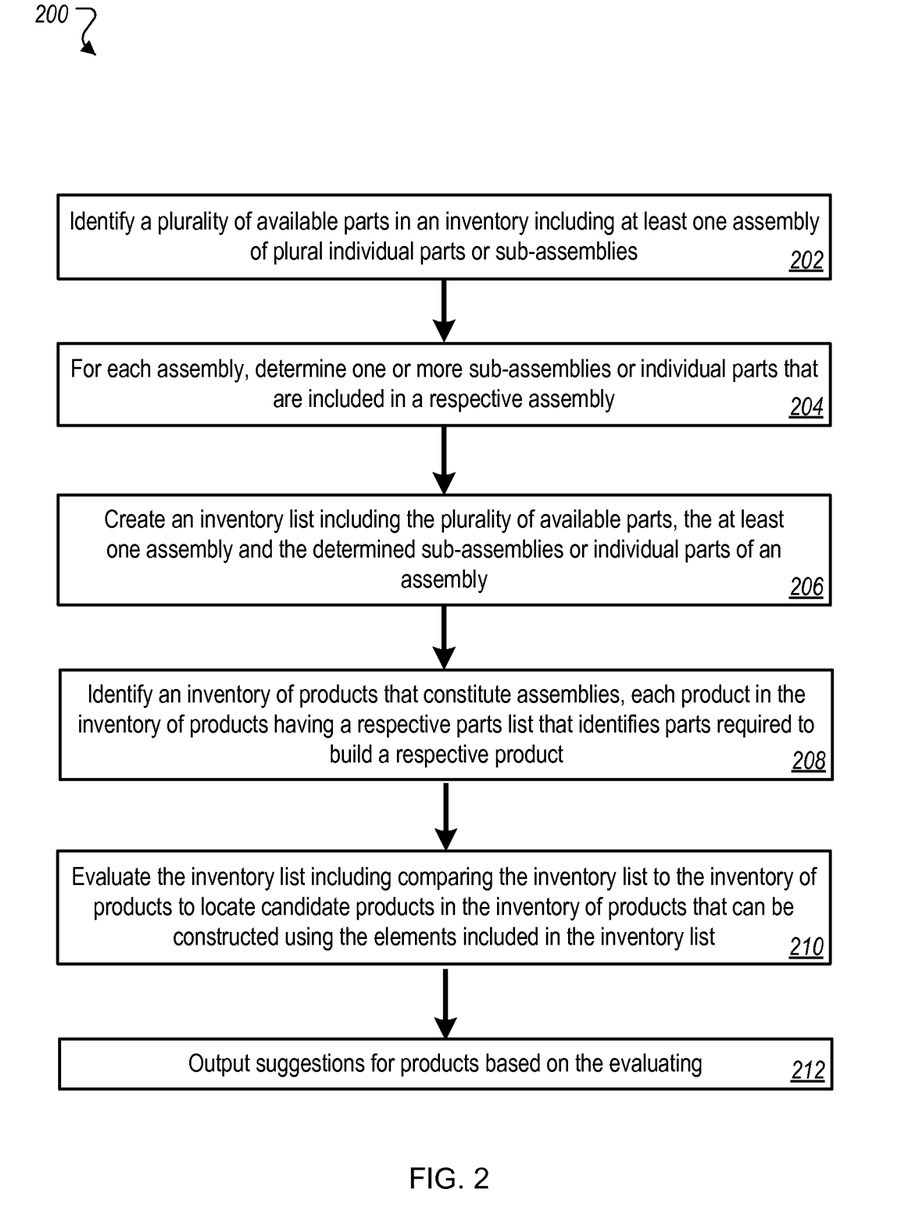
FIG. 2 is a flowchart of an example process for suggesting products that can be made with existing parts.

FIG. 2 is a flowchart of an example process 200 for suggesting products that can be constructed from existing parts. In some implementations, the product suggestion system 102 can perform steps of the process 200 using instructions that are executed by one or more processors. FIG. 1 is used to provide example structures for performing the steps of the process 200.

A plurality of available parts in an inventory is identified, including identifying at least one assembly of plural individual parts or sub-assemblies (202). The parts identification engine 114, for example, can identify available parts from the parts inventory 116. Identification of the parts can include, for example, identifying at least one assembly of plural individual parts or sub-assemblies, e.g., that are on-site and can be used immediately to build new products. Available parts can be based on inventory (of parts) and can include not only parts that are not part of another assembly but may also be parts that have already been joined with other parts in assemblies or sub-assemblies, such as in other finished products. Inventory can be the inventory of a single user, a single manufacturer, or other single entity. In some implementations, inventory is an aggregate, such as for plural users, manufacturers or other entities, such as for example an aggregation of parts of plural users that are in a same geographic location.

In some implementations, identifying the plurality of available parts in the inventory can include evaluating one or more images of the available parts and recognizing individual parts, sub-assemblies and assemblies from the images. For example, the parts identification engine 114 can include an image recognition module (including a camera, and processing software, hardware or a combination of the two) or some other component that uses feature recognition and/or other processing techniques to match geometric, topological and/or other properties of an image to known photos, dimensions and/or other information for parts/sub-assemblies/assemblies in the parts inventory 116.

In some implementations, identifying the plurality of available parts can include evaluating a bill of materials for an assembly to locate individual parts and sub-assemblies and deconstructing located sub-assemblies into individual parts. For example, the parts identification engine 114 can use information in the product manufacturing bill of materials 134 to construct at least a portion of the available parts inventory list 118. In some implementations, the available parts inventory list 118 can be represented as a list of parts/sub-assemblies or assemblies comprising already available parts/sub-assemblies/assemblies together with parts/sub-assemblies/assemblies that can be readily harvested from existing sub-assemblies, assemblies and products.

In some implementations, identifying the plurality of available parts can include evaluating each sub-assembly to locate further sub-assemblies or individual parts of a respective sub-assembly. For example, to build the identifying the plurality of available parts, the parts identification engine 114 may have to iteratively decompose assemblies 124 into yet further sub-assemblies 122 as well as sub-assemblies 122 into yet further sub-assemblies 122, e.g., to create an available parts inventory list 118 that is exclusively comprised of parts 120.

For each assembly, one or more sub-assemblies or individual parts that are included in a respective assembly are determined (204). For example, the parts identification engine 114 can determine, for each assembly, plural sub-assemblies 122 or individual parts 120 included in a respective assembly or sub-assembly.

An inventory list is created that includes, for example, the plurality of available parts, the at least one assembly, and the determined sub-assemblies or individual parts of an assembly (206). Using information associated with the assemblies, sub-assemblies and parts, for example, the parts identification engine 114 can create an available parts inventory list 118 that includes the plurality of available parts, the at least one assembly, and the determined sub-assemblies or individual parts of an assembly. In some implementations, the available parts inventory list 118 can be reduced to (or views can be defined for) a list that includes parts only, including existing parts 120 together with parts that can be obtained from the sub-assemblies 122 and assemblies 124.

An inventory of products is identified that constitute assemblies. Each product in the inventory of products has a respective parts list that identifies parts required to build a respective product (208). As an example, for each product in the products inventory 130, the product identification engine 128 can generate information for inclusion in the product components list 132 that identifies parts that are required to build each product 138 from the respective parts list 136.

The inventory list is evaluated including comparing the inventory list to the inventory of products to locate candidate products in the inventory of products that can be constructed using the elements included in the inventory list (210). As an example, the inventory evaluation engine 140 can evaluate the available parts inventory list 118 and the product components list 132. Specifically, the inventory evaluation engine 140 can determine which products in the product components list 132 can be built using available parts/sub-assemblies/assemblies in the available parts inventory list 118. In some implementations, one or more partial builds can be identified. A partial build can be a product that may be partially built. When identifying partial builds, information regarding missing parts/sub-assemblies/assemblies or combinations of the three can be identified. Missing parts, can be constructed, manufactured, 3D printed or otherwise obtained. Information for buildable products can be stored, for example, as candidate constructible products 142.

In some implementations, evaluating the inventory list can include determining a set of candidate products that cannot be constructed based on the inventory list. For example, at least one candidate product (e.g., one of the candidate constructible products 142) that cannot be constructed can be identified. One or more parts (e.g., from the associated parts list 136 for the product and referred to herein as a "missing part") can be determined that are not included in inventory that is required to build the one candidate product. A list can be output that lists the determined one or more parts (e.g., the missing parts) required to build the one candidate product. For example, in addition to producing a listing that includes products that can be built immediately (e.g., from parts in the available parts inventory list 118), the product suggestions 146 can identify products for which parts/sub-assemblies/assemblies are incomplete (e.g., a single part can be printed by the 3D printer or quickly ordered).

In some implementations, outputting the suggestions can include locating instructions for assembling one or more products that are suggested and outputting instructions for assembling a selected one of the suggestions. For example, for each of the candidate products included in the product suggestions 146, the product suggestion system 102 can provide an instructions list that can identify how to use parts and sub-assemblies to build a given product. The instructions can include, for example, information associated with a bill of materials for the product.

In some implementations, the process 200 can further include rating the parts/sub-assemblies/assemblies in the inventory list based on one or more criteria, and evaluating the inventory can include creating suggestions based on the use of highest-rated components from the inventory list. For example, the rating engine 148 can rate components in the available parts inventory list 118 based on a predicted suitability for use in constructing products, as described above. In some implementations, rating the parts/sub-assemblies/assemblies can include determining a value associated with each component in the inventory list, and the value can be based on one or more of an initial cost of the component, a replacement cost of the component, a commonality of the component, or a complexity of the component. Other factors can be used to rate components.

Suggestions for products are output based on the evaluating (212). For example, the product build suggestion engine 144 can create product suggestions 146 using information in the candidate constructible products 142. The product suggestions 146 can be generated, for example, upon receipt of a request (e.g., a request for suggested constructible products) from the client device 104.

In some implementations, the process 200 can further include outputting instructions to print, using a 3D printer, at least one of the one or more parts not included in inventory. For example, in addition to providing the product suggestions 146, the product build suggestion engine 144 can output print instructions 147 for parts, if any, that are to be printed in association with particular suggested products. In some implementations, the product build suggestion engine 144 or other component of the product suggestion system 102 can output a list of sub-assemblies/assemblies that are to be disassembled, e.g., if corresponding parts or sub-assemblies are needed to construct a candidate product that is elected for construction. Further, instructions for assembling one or more products of the product suggestions 146 can be output.

In some implementations, the process 200 can further include operations for classifying candidate products and identifying a candidate product, based on the classification, for selection to be constructed. For example, the product suggestion system 102 can provide candidate product information for presentation in the user interface 106 to prompt the user for hints to classify a type of candidate product that the user may desire to build/assemble, e.g., upon user selection of the classification types control 150. The user can be prompted, for example, to determine (or specify) a classification of one or more candidate products, and the classification engine 152 can classify one or more respective products in the candidate constructible products 142 based on the user-specified classification. The classification information can be used, for example, when the user selects products to be constructed, e.g., through the manufacture decisions control 156.

Figure 3:
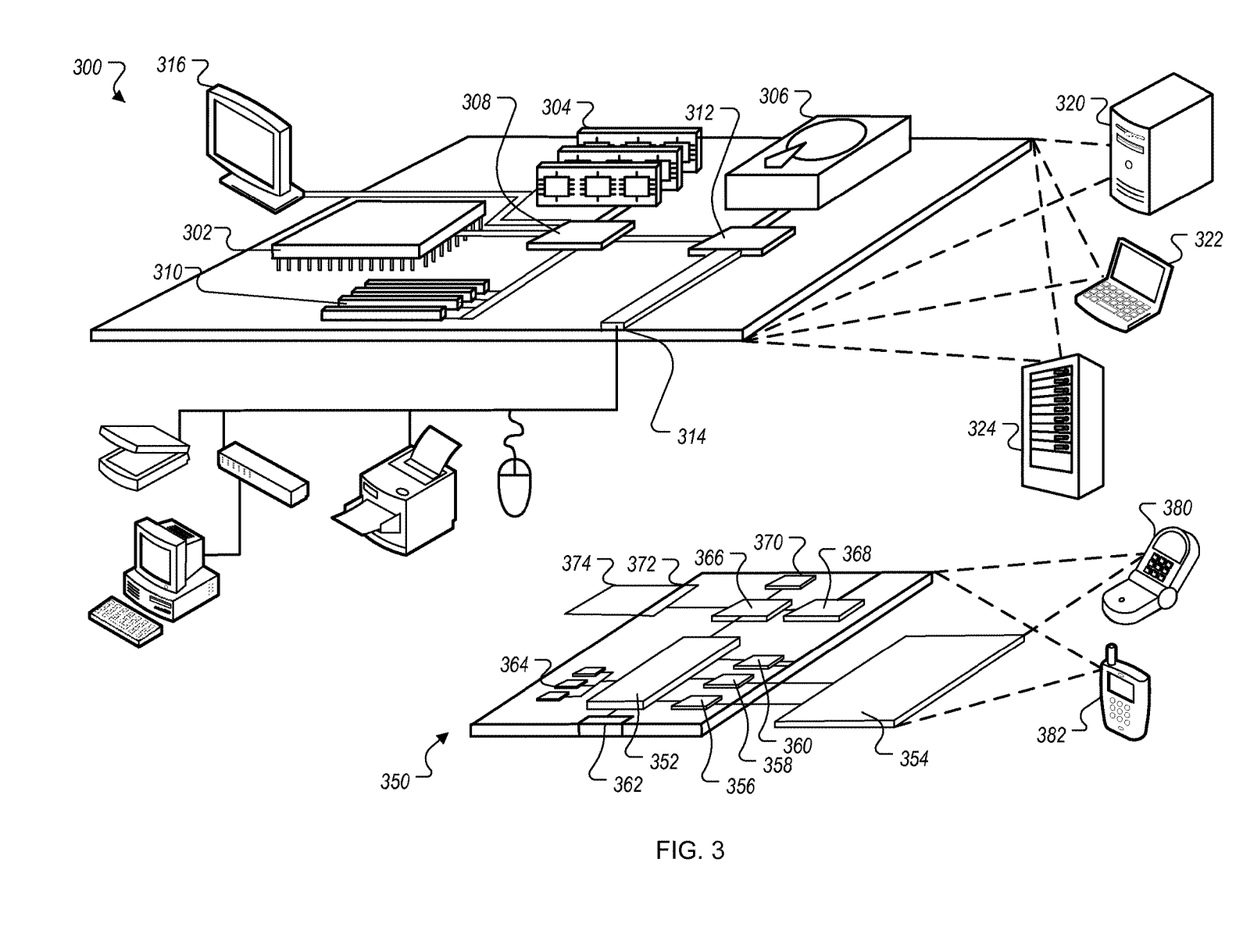
FIG. 3 is a block diagram of an example computer system that can be used to implement the methods, systems and processes described in this disclosure.

FIG. 3 is a block diagram of example computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 300 is further intended to represent any other typically non-mobile devices, such as televisions or other electronic devices with one or more processors embedded therein or attached thereto. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 300 includes a processor 302, memory 304, a storage device 306, a high-speed controller 308 connecting to memory 304 and high-speed expansion ports 310, and a low-speed controller 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed controller 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed bus 314. The low-speed bus 314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as computing device 350. Each of such devices may contain one or more of computing devices 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The computing device 350 may also be provided with a storage device, such as a micro-drive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the computing device 350, such as control of user interfaces, applications run by computing device 350, and wireless communication by computing device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of computing device 350 with other devices. External interface 362 may provide, for example, for wired communication (e.g., via a docking procedure) or for wireless communication (e.g., via Bluetooth® or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to computing device 350 through expansion interface 372, which may include, for example, a subscriber identification module (SIM) card interface. Such expansion memory 374 may provide extra storage space for computing device 350, or may also store applications or other information for computing device 350. Specifically, expansion memory 374 may include instructions to carry out or supplement the processes described above, and may include secure information also. Thus, for example, expansion memory 374 may be provide as a security module for computing device 350, and may be programmed with instructions that permit secure use of computing device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368 (e.g., a radio-frequency transceiver). In addition, short-range communication may occur, such as using a Bluetooth®, WiFi, or other such transceiver (not shown). In addition, GPS receiver module 370 may provide additional wireless data to computing device 350, which may be used as appropriate by applications running on computing device 350.

Computing device 350 may also communicate audibly using audio codec 360, which may receive spoken information from a user and convert it to usable digital information. Audio codec 360 may likewise generate audible sound for a user, such as through a speaker, e.g., in a handset of computing device 350. Such sound may include sound from voice telephone calls, may include recorded sound (e.g., voice messages, music files, etc.) and may also include sound generated by applications operating on computing device 350.

The computing device 350 may be implemented in a number of different forms, as shown in the figure. For example, it may be implemented as a cellular telephone 380. It may also be implemented as part of a smartphone 382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying, by a product suggestion system comprising at least one computing device, a plurality of available parts in an inventory including at least one assembly, wherein identifying the plurality of available parts comprises: i) evaluating images of the available parts, the images obtained from at least one camera; ii) recognizing individual parts, sub-assemblies and assemblies from the images using feature recognition techniques, and iii) iteratively decomposing the at least one assembly into individual parts, one or more sub-assemblies and individual parts that are included in the one or more sub-assemblies;
   creating, by the product suggestion system comprising the at least one computing device, an inventory list including the plurality of available parts, which includes the individual parts of the at least one assembly and the one or more sub-assemblies of the at least one assembly, the inventory list further including information as to time, expense, or both, associated with disassembling the at least one assembly to harvest specific parts from the at least one assembly;
   identifying, by the product suggestion system comprising the at least one computing device, an inventory of products that constitute assemblies, each product in the inventory of products having a respective parts list that identifies parts required to build a respective product;
   evaluating, by the product suggestion system comprising the at least one computing device, the inventory list including comparing the inventory list to the inventory of products to locate candidate products in the inventory of products that can be constructed using elements included in the inventory list, wherein evaluating includes determining a set of candidate products that can be constructed based on the inventory list, including identifying at least one product that can be constructed using at least one of the specific parts from the at least one assembly;
   outputting, by the product suggestion system comprising the at least one computing device, suggestions for products to construct based on the set of candidate products and the information as to time, expense, or both, associated with disassembling the at least one assembly; and
   outputting instructions to print, using a 3D printer, at least one or more parts not included in inventory.

2. The method of claim 1, further comprising providing information for use in a user interface to prompt a user for hints to classify a type of candidate product including prompting the user to determine a classification of the candidate product, classifying the products in the inventory of products based on a response to the prompt, and selecting a candidate product based on the classifying and the inventory list.

3. The method of claim 1, wherein evaluating the inventory list includes determining a set of candidate products that cannot be constructed based on the inventory list, including identifying at least one candidate product that cannot be constructed, determining one or more parts not included in inventory that is required to build the one candidate product, and outputting a list of the determined one or more parts required to build the one candidate product.

4. The method of claim 1, wherein outputting suggestions includes locating instructions for assembling one or more products that are suggested and outputting instructions for assembling a selected one of the suggestions.

5. The method of claim 1, further comprising rating parts, sub-assemblies and assemblies in the inventory list based on one or more criteria, and wherein evaluating the inventory list includes creating suggestions based on use of highest-rated components from the inventory list.

6. The method of claim 5, wherein rating the parts includes determining a value associated with each component in the inventory list, and wherein the value is based on one or more of an initial cost of the component, a replacement cost of the component, a commonality of the component, or a complexity of the component.

7. The method of claim 1, wherein identifying the plurality of available parts includes evaluating a bill of materials for an assembly to locate individual parts and sub-assemblies and deconstructing located sub-assemblies into individual parts.

8. The method of claim 1, wherein identifying the plurality of available parts comprises iteratively decomposing assemblies by evaluating each sub-assembly to locate further sub-assemblies of a respective sub-assembly, while disregarding any assemblies that have restrictions due to scheduled use or delivery.

9. A computer program product embodied in a non-transitory computer-readable medium including instructions, that when executed, cause one or more processors of a product suggestion system comprising at least one computing device to:
identify, by the product suggestion system comprising the at least one computing device, a plurality of available parts in an inventory including at least one assembly, wherein identifying the plurality of available parts comprises: i) evaluating images of the available parts, the images obtained from at least one camera; ii) recognizing individual parts, sub-assemblies and assemblies from the images using feature recognition techniques, and iii) iteratively decomposing the at least one assembly into individual parts, one or more sub-assemblies and individual parts that are included in the one or more sub-assemblies;
create, by the product suggestion system comprising the at least one computing device, an inventory list including the plurality of available parts, which includes the individual parts of the at least one assembly and the one or more sub-assemblies of the at least one assembly, the inventory list further including information as to time, expense, or both, associated with disassembling the at least one assembly to harvest specific parts from the at least one assembly;
identify, by the product suggestion system comprising the at least one computing device, an inventory of products that constitute assemblies, each product in the inventory of products having a respective parts list that identifies parts required to build a respective product;
evaluate, by the product suggestion system comprising the at least one computing device, the inventory list including comparing the inventory list to the inventory of products to locate candidate products in the inventory of products that can be constructed using elements included in the inventory list, and determine a set of candidate products that can be constructed based on the inventory list, including at least one product that can be constructed using at least one of the specific parts from the at least one assembly;
output, by the product suggestion system comprising the at least one computing device, suggestions for products to construct based on the set of candidate products and the information as to time, expense, or both, associated with disassembling the at least one assembly; and
output instructions to print, using a 3D printer, at least one or more parts not included in inventory.

10. The computer program product embodied in the non-transitory computer-readable medium of claim 9, including instructions that, when executed, cause the one or more processors to: provide information for use in a user interface to prompt a user for hints to classify a type of candidate product including prompting the user to determine a classification of the candidate product, classify the products in the inventory of products based on a response to the prompt, and select a candidate product based on the classification and the inventory list.

11. The computer program product embodied in the non-transitory computer-readable medium of claim 9, including instructions that, when executed, cause the one or more processors to evaluate the inventory list by causing the one or more processors to: determine a set of candidate products that cannot be constructed based on the inventory list, including identifying at least one candidate product that cannot be constructed, determine one or more parts not included in inventory that is required to build the one candidate product, and output a list of the determined one or more parts required to build the one candidate product.

12. The computer program product embodied in the non-transitory computer-readable medium of claim 9, including instructions that, when executed, cause the one or more processors to identify the plurality of available parts in the inventory by causing the one or more processors to: evaluate a bill of materials for an assembly to locate individual parts and sub-assemblies and deconstruct located sub-assemblies into individual parts.

13. A system comprising:
at least one camera;
one or more hardware processors; and
one or more non-transitory memory elements including instructions that, when executed, cause the one or more processors to:
identify a plurality of available parts in an inventory including at least one assembly, wherein identifying the plurality of available parts comprises evaluating images obtained by the at least one camera to recognize individual parts, sub-assemblies and assemblies from the images using feature recognition and processing techniques that match geometric, topological, and other properties of an image to known photos, dimensions, and other parts inventory information, and iteratively decomposing the at least one assembly into individual parts, one or more sub-assemblies and individual parts that are included in the one or more sub-assemblies;
create an inventory list including the plurality of available parts, which includes the individual parts of the at least one assembly and the one or more sub-assemblies of the at least one assembly, the inventory list further including information as to time, expense, or both, associated with disassembling the at least one assembly to harvest specific parts from the at least one assembly;
identify an inventory of products that constitute assemblies, each product in the inventory of products having a respective parts list that identifies parts required to build a respective product;
evaluate the inventory list including comparing the inventory list to the inventory of products to locate candidate products in the inventory of products that can be constructed using elements included in the inventory list, and determine a set of candidate products that can be constructed based on the inventory list, including at least one product that can be constructed using at least one of the specific parts from the at least one assembly;
output suggestions for products to construct based on the set of candidate products and the information as to time, expense, or both, associated with disassembling the at least one assembly; and
output instructions to print, using a 3D printer, at least one or more parts not included in inventory.

14. The system of claim 13, wherein the one or more memory elements include instructions that, when executed, cause the one or more processors to: provide information for use in a user interface to prompt a user for hints to classify a type of candidate product including prompting the user to determine a classification of the candidate product, classify the products in the inventory of products based on a response to the prompt, and select a candidate product based on the classification and the inventory list.

15. The system of claim 13, wherein the one or more memory elements include instructions that, when executed, cause the one or more processors to evaluate the inventory list by causing the one or more processors to: determine a set of candidate products that cannot be constructed based on the inventory list, including identifying at least one candidate product that cannot be constructed, determine one or more parts not included in inventory that is required to build the one candidate product, and output a list of the determined one or more parts required to build the one candidate product.

16. The system of claim 13, wherein the one or more memory elements include instructions that, when executed, cause the one or more processors to identify the plurality of available parts in the inventory by causing the one or more processors to: evaluate a bill of materials for an assembly to locate individual parts and sub-assemblies and deconstruct located sub-assemblies into individual parts.

\* \* \* \* \*